United States Patent
Diamond

(10) Patent No.: US 8,941,668 B2
(45) Date of Patent: *Jan. 27, 2015

(54) METHOD AND SYSTEM FOR A SCALABLE DISCRETE GRAPHICS SYSTEM

(75) Inventor: Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/877,723

(22) Filed: Jun. 25, 2004

(65) Prior Publication Data

US 2005/0285865 A1 Dec. 29, 2005

(51) Int. Cl.
*G06F 15/16* (2006.01)
*G06F 3/14* (2006.01)
*G06F 13/40* (2006.01)

(52) U.S. Cl.
CPC .............. *G06F 13/4027* (2013.01); *G06F 3/14* (2013.01); *G06F 2213/0026* (2013.01)
USPC .......................................... 345/503; 345/501

(58) Field of Classification Search
CPC ......... G06F 15/16; G06F 15/76; G06F 15/80; G06F 5/16; G06F 2009/44515; G06T 1/20; G06T 2200/04; G06T 2210/52
USPC ............ 710/38, 20, 1, 312, 62; 345/520, 543, 345/156, 562, 505, 501–503; 713/601
See application file for complete search history.

(56) References Cited

U.S. PATENT DOCUMENTS

| | | | |
|---|---|---|---|
| 4,942,391 A | 7/1990 | Kikuta | |
| 5,251,295 A | 10/1993 | Ikenoue et al. | |
| 5,485,559 A | 1/1996 | Sakaibara et al. | |
| 5,781,747 A * | 7/1998 | Smith et al. | 710/300 |
| 5,794,016 A | 8/1998 | Kelleher | |
| 5,956,046 A | 9/1999 | Kehlet et al. | |
| 6,044,215 A * | 3/2000 | Charles et al. | 703/25 |
| 6,141,021 A * | 10/2000 | Bickford et al. | 345/503 |
| 6,167,476 A | 12/2000 | Olarig et al. | |
| 6,206,087 B1 | 3/2001 | Nakase et al. | |
| 6,282,596 B1 | 8/2001 | Bealkowski et al. | |

(Continued)

FOREIGN PATENT DOCUMENTS

| | | |
|---|---|---|
| CN | 1159957 | 9/1997 |
| EP | 0279226 | 8/1988 |

(Continued)

OTHER PUBLICATIONS http://www.intel.com/technology/pciexpress/downloads/3rdgenwhitepaper.pdf 2002.*

(Continued)

*Primary Examiner* — Michelle L Sams

(57) ABSTRACT

A scalable discrete graphics system (DGS) is disclosed. The DGS includes a serial bus bridge configured to couple a plurality of GPUs to a serial bus. A serial bus connector is coupled to the serial bus bridge. A system chassis coupled to the serial bus bridge and the serial bus connector and configured to house the GPUs. The serial bus connector is configured to removably connect to a computer system. The GPUs access the computer system via the serial bus bridge and the serial bus connector to cooperatively execute 3-D graphics instructions from the computer system.

22 Claims, 20 Drawing Sheets

(56) References Cited

U.S. PATENT DOCUMENTS

| | | | |
|---|---|---|---|
| 6,304,952 B1 | 10/2001 | Suzuoki | |
| 6,359,624 B1 | 3/2002 | Kunimatsu | |
| 6,397,343 B1 | 5/2002 | Williams et al. | |
| 6,473,086 B1 | 10/2002 | Morein et al. | |
| 6,476,816 B1 | 11/2002 | Deming et al. | |
| 6,535,216 B1 | 3/2003 | Deming et al. | |
| 6,570,571 B1 | 5/2003 | Morozumi | |
| 6,624,816 B1 | 9/2003 | Jones, Jr. | |
| 6,630,936 B1* | 10/2003 | Langendorf | 345/562 |
| 6,631,474 B1 | 10/2003 | Cai et al. | |
| 6,646,645 B2* | 11/2003 | Simmonds et al. | 345/502 |
| 6,654,826 B1 | 11/2003 | Cho et al. | |
| 6,670,958 B1 | 12/2003 | Aleksic et al. | |
| 6,711,691 B1 | 3/2004 | Howard et al. | |
| 6,760,031 B1* | 7/2004 | Langendorf et al. | 345/502 |
| 6,762,764 B2 | 7/2004 | Hiwada et al. | |
| 6,772,265 B2 | 8/2004 | Baweja et al. | |
| 6,832,269 B2* | 12/2004 | Huang et al. | 710/11 |
| 6,835,070 B1 | 12/2004 | Law | |
| 6,864,891 B2 | 3/2005 | Myers | |
| 6,874,042 B2 | 3/2005 | Sauber | |
| 6,914,779 B2 | 7/2005 | Askeland et al. | |
| 6,919,894 B2 | 7/2005 | Emmot et al. | |
| 6,956,579 B1 | 10/2005 | Diard et al. | |
| 6,985,152 B2 | 1/2006 | Rubinstein et al. | |
| 7,019,752 B1* | 3/2006 | Paquette et al. | 345/543 |
| 7,024,510 B2 | 4/2006 | Olarig | |
| 7,058,829 B2 | 6/2006 | Hamilton | |
| 7,065,597 B2 | 6/2006 | Kumar et al. | |
| 7,079,149 B2* | 7/2006 | Main et al. | 345/520 |
| 7,079,510 B1 | 7/2006 | Toskala | |
| 7,080,181 B2 | 7/2006 | Wolford | |
| 7,119,808 B2* | 10/2006 | Gonzalez et al. | 345/502 |
| 7,203,788 B2* | 4/2007 | Liu | 710/315 |
| 7,321,367 B2 | 1/2008 | Isakovic et al. | |
| 7,634,668 B2 | 12/2009 | White et al. | |
| 7,663,633 B1 | 2/2010 | Diamond et al. | |
| 8,411,093 B2 | 4/2013 | Diamond et al. | |
| 2002/0073247 A1 | 6/2002 | Baweja et al. | |
| 2002/0097220 A1* | 7/2002 | Ferguson et al. | 345/156 |
| 2002/0135584 A1* | 9/2002 | Lee | 345/531 |
| 2002/0141152 A1 | 10/2002 | Pokharna et al. | |
| 2002/0180725 A1 | 12/2002 | Simmonds et al. | |
| 2003/0067470 A1 | 4/2003 | Main et al. | |
| 2004/0008200 A1 | 1/2004 | Naegle et al. | |
| 2004/0032861 A1 | 2/2004 | Lee | |
| 2004/0039954 A1 | 2/2004 | White et al. | |
| 2004/0085726 A1 | 5/2004 | Ting et al. | |
| 2004/0125111 A1* | 7/2004 | Tang-Petersen et al. | 345/506 |
| 2004/0199696 A1 | 10/2004 | Chari et al. | |
| 2005/0012748 A1 | 1/2005 | Stickels | |
| 2005/0012749 A1 | 1/2005 | Gonzalez et al. | |
| 2005/0017980 A1 | 1/2005 | Chang et al. | |
| 2005/0028015 A1 | 2/2005 | Asano et al. | |
| 2005/0088445 A1* | 4/2005 | Gonzalez et al. | 345/502 |
| 2005/0190190 A1 | 9/2005 | Diard et al. | |
| 2005/0190536 A1* | 9/2005 | Anderson et al. | 361/686 |
| 2005/0270298 A1* | 12/2005 | Thieret | 345/502 |
| 2008/0084419 A1 | 4/2008 | Bakalash et al. | |

FOREIGN PATENT DOCUMENTS

| | | |
|---|---|---|
| JP | 2001-5574 A | 1/2001 |
| JP | 2001-290754 A | 10/2001 |
| JP | 2002-32324 A | 1/2002 |
| JP | 2003-160495 A | 6/2003 |
| WO | 03083680 | 10/2003 |
| WO | 03100588 | 12/2003 |

OTHER PUBLICATIONS http://www.intel.com/support/motherboards/desktop/sb/cs-012073.htm Jun. 4, 2004.*

Rupley, Sebastian "Intel Developer Forum to Spotlight PCI Express", http://findarticles.com/p/articles/mi_zdpcm/is_200209/ai_ziff30704/print.*

Bhatt, Ajay V., "Creating a PCI Express Interconnect", 2002.*

U.S. Appl. No. 60/523,084 provisional of 2008/0084419 A1, Nov. 19, 2003.* http://web.archive.org/web/20030416155958/www.digitaltigers.com/sidecar.shtml.

http://web.archive.org/web/20030416211951/www.digitaltigers.com/sidecar-dualview.shtml.

http://www.everythingusb.com/news/index/3493.htm.

http://www.intel.com/support/motherboards/desktop/sb/cs-012073.htm.

Bhatt, Ajay V., "Creating a PCI Interconnet", 2002.

U.S. Appl. No. 60/523,084 of Bakalash et al. (2008/0084419), Nov. 19, 2003.

http://web.archive.org/web/20030416155958/www.digitaltigers.com/sidecar.shtml, 2003.

http://web.archive.org/web/20030416211951/www.digitaltigers.com/sidecar-dualview.shtml, 2003.

http://www.everythingusb.com/news/index/3493.htm, 2002.

* cited by examiner

US 8,941,668 B2

METHOD AND SYSTEM FOR A SCALABLE DISCRETE GRAPHICS SYSTEM

CROSS REFERENCE TO RELATED APPLICATIONS

This application is related to, and incorporates by reference, the following commonly assigned U.S. Patent Applications:

A DISCRETE GRAPHICS SYSTEM UNIT FOR HOUSING A GPU, by Diamond, M., filed on Jun. 25, 2014, Ser. No. 10/877,724;

A METHOD AND SYSTEM FOR STAND ALONE GRAPHICS INDEPENDENT OF COMPUTER SYSTEM FORM FACTOR, by Diamond et al., filed on Jun. 25, 2014, Ser. No. 10/877,642; and A MULTIPLE GPU GRAPHICS SYSTEM FOR IMPLEMENTING COOPERATIVE GRAPHICS INSTRUCTION EXECUTION, by Diamond et al., filed on Jun. 25, 2014, Ser. No. 10/877/243.

FIELD OF THE INVENTION

The present invention is generally related to computer implemented graphics. More particularly, the present invention is directed towards a highly scalable graphics processor for graphics applications.

BACKGROUND OF THE INVENTION

The rendering of three-dimensional (3D) graphical images is of interest in a variety of electronic games and other applications. Rendering is the general term that describes the overall multi-step process of transitioning from a database representation of a 3D object to a pseudo realistic two-dimensional projection of the object onto a viewing surface.

The rendering process involves a number of steps, such as, for example, setting up a polygon model that contains the information which is subsequently required by shading/texturing processes, applying linear transformations to the polygon mesh model, culling back facing polygons, clipping the polygons against a view volume, scan converting/rasterizing the polygons to a pixel coordinate set, and shading/lighting the individual pixels using interpolated or incremental shading techniques.

Graphics Processing Units (GPUs) are specialized integrated circuit devices that are commonly used in graphics systems to accelerate the performance of a 3D rendering application. GPUs are commonly used in conjunction with a central processing unit (CPU) to generate 3D images for one or more applications executing on a computer system. Modern GPUs typically utilize a graphics pipeline for processing data.

The power of modern GPU sub-systems (e.g., add-in graphics cards, etc.) is increasingly comprising a larger share of the overall value of a desktop computer system and can rival the complexity and sophistication of a computer system's CPU. A modern GPU can comprise an integrated circuit device having over 200 million transistors and running at several hundred megahertz. Such a modern GPU can consume hundreds of watts of power and require carefully designed thermal protection components (e.g., heat sink fans, access to adequate airflow, etc.).

Generally, the layout and performance of GPU subsystems (e.g., GPU graphics cards) are constrained by a number of overall system design factors. GPU subsystems are generally designed to interface with an ATX compliant computer system motherboard. The ATX form factor refers to the widely used industry standard motherboard form factor supported by the leading industry manufacturers. Such manufactures include, for example, CPU manufacturers, chipset manufacturers, motherboard manufacturers, and the like.

For example, the ATX form factor allows a limited amount of space for a card-based GPU. A typical card-based GPU connects to the motherboard via an AGP slot. The AGP slot has a limited amount of space for the components of the card-based GPU. The limited amount of space directly impacts the efficiency of the thermal protection components of the card-based GPU. Additionally, as card-based GPUs have increased in performance, the available power (e.g., the specified voltages and currents) of the AGP connection has become increasingly insufficient.

The BTX form factor refers to a more recent industry standard motherboard form factor. The BTX form factor is generally considered the next generation ATX follow on specification for a "desktop" PC chassis and, as with the earlier ATX form factor, is widely supported by the leading industry manufacturers. Unfortunately, the BTX form factor persons even more problems with respect to high-performance GPU subsystems.

The BTX form factor is problematic in that the BTX design rules place a number of constraints on the form and performance of the GPU subsystem. For example, BTX design rules locate the desktop computer system's CPU at the front entry point for cooling airflow, while positioning the GPU subsystem (e.g., graphics card) in its downstream airflow and adding restrictions on the GPU subsystem's physical dimensions (e.g., x-y-z size), available air flow, available thermal dissipation, and power delivery.

Similar constraints are in place for laptop computer system form factors. For example, the future evolution of GPU subsystems for laptop computers is constrained by the fact that the laptop chassis (e.g., motherboard platform, case, airflow, etc.) is optimized for the requirements of CPUs and their associated chipsets. This optimization limits the available thermal dissipation budget, power delivery, and physical dimensions (e.g., x-y-z size) for any graphics subsystem implementation.

Constraints are also placed on the future performance evolution of GPU subsystems by some newly emerging industry standards. PCI Express is one such standard. Some versions of the PCI Express standard specify a maximum power available for a coupled device (e.g., 150 W prescribed by the PCI SIG specification for PCI Express Graphics). As GPU subsystem performance continues to evolve, the requirements of high-end GPU implementations may greatly exceed the specified maximum power available. In addition to inadequate power, some versions of the PCI Express standard specify an insufficient amount of bandwidth between the GPU subsystem and the rest of the computer system platform (e.g., system memory, CPU, etc.). The insufficient bandwidth limits the upward scalability of the GPU subsystem performance by bottlenecking data pathways between the GPU subsystem and the computer system platform resources.

SUMMARY

Embodiments of the present invention provide a method and system for stand alone graphics independent of computer system form factor. Embodiments of the present invention should eliminate data transfer bandwidth constraints and form factor constraints that limit the upward scalability of a GPU subsystem.

In one embodiment, the present invention is implemented as a scalable discrete graphics system (DGS). The DGS includes a serial bus bridge (e.g., PCI Express) configured to couple a plurality of GPUs to a serial bus. A serial bus connector is coupled to the serial bus bridge. A system chassis coupled to the serial bus bridge and the serial bus connector and configured to house the GPUs. The serial bus connector is configured to removably connect to a computer system. The GPUs access the computer system via the serial bus bridge and the serial bus connector to cooperatively execute 3-D graphics instructions from the computer system. In one embodiment, the serial bus bridge is configured to enable an upward scaling of a 3-D rendering performance of the computer system by coupling at least one new GPU to function with an existing GPU. The new GPU and the existing GPU cooperatively execute graphics instructions from the computer system. In one embodiment, the multiple GPU graphics system uses multiple card-based GPUs. The GPUs can be implemented as single GPU add-in graphics cards (e.g., one GPU per card), multi-GPU add-in graphics cards (e.g., two or more GPUs per card). In one embodiment, multiple add-in graphics cards are used wherein each card has two or more GPUs.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
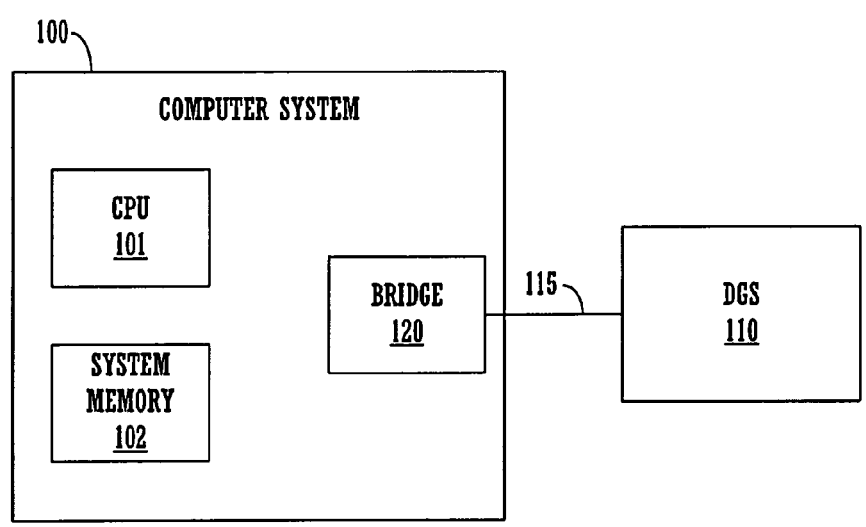
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

With reference now to FIG. 1, a computer system 100 in accordance with one embodiment of the present invention is shown. Computer system 100 in accordance with one embodiment of the present invention provides the execution platform for implementing certain software-based functionality of the present invention. As depicted in FIG. 1, the computer system 100 includes a CPU 101 and a system memory 102. A discrete graphics system (e.g., hereafter DGS) 110 is coupled to the CPU 101 and the system memory 102 via a bus 115 and a bridge 120. In the system 100 embodiment, the system memory 102 stores instructions and data for both the CPU 101 and the DGS 110. The DGS 110 accesses the system memory 102 via the bridge 120. The bridge 120 communicates with the DGS 110 via the bus 115 and functions by bridging the respective data formats of the bus 115 and the computer system 100. It should be noted that the computer system 100 includes any type of computing device, including, without limitation, a desktop computer, server, workstation, laptop computer, computer-based simulator, palm-sized computer and other portable/handheld devices such as a personal digital assistant, tablet computer, game console, cellular telephone, smart phone, handheld gaming systems and the like As described above, certain processes and steps of the present invention are realized, in one embodiment, as a series of instructions (e.g., software program) that reside within computer readable memory (e.g., system memory 102) of a computer system (e.g., system 100) and are executed by the CPU 101 and DGS 110 of system 100. When executed, the instructions cause the computer system 100 to implement the functionality of the present invention as described below.

The computer system 100 embodiment of FIG. 1 shows the basic components of a computer system coupled to utilize a DGS 110 to execute 3D graphics instructions. The DGS 10 includes at least one GPU for executing 3D graphics instructions. The GPU(s) is enclosed within a DGS system chassis configured to house the GPU(s) and provide the necessary resources for its optimal operation. The DGS 110 includes a serial bus connector to couple to the bus 115 and thereby couple the DGS 110 to the bridge component 120. In one embodiment, the bus 115 is a PCI Express serial bus. The GPU(s) of the DGS 110 accesses the computer system via the serial bus 115 to execute 3D graphics instructions for the computer system. In this manner, the DGS 110 provides a discrete graphics system that is separate and independent from the resources/constraints of the computer system 100. Internal components of the DGS 110 are described greater detail below (e.g., FIG. 7, etc.).

Figure 2:
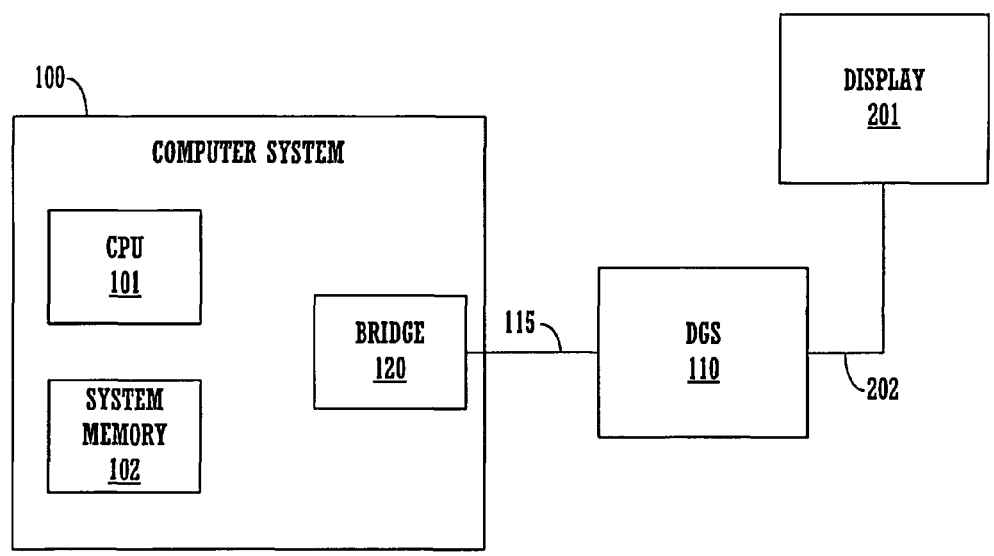
FIG. 2 shows a DGS in accordance with one embodiment of the present invention wherein the DGS is coupled to drive a display.

FIG. 2 shows the DGS 110 in accordance with one embodiment of the present invention wherein the DGS 110 is coupled to directly drive a display 201 (e.g., an LCD display, CRT display, etc.). In this embodiment, the DGS 110 includes the components (e.g., frame buffers, DACs, etc.) necessary to drive the display 201. The display 201 is coupled to the DGS 110 via, for example, a display adapter cable 202 (e.g., analog video cable, digital video cable, or the like).

The DGS 110 embodiment of FIG. 2 provides an advantage in that rendered video data (e.g., frames of rendered 3D video) can be sent directly to the display 201 supposed to being sent over the bus 115 to the computer system 100. This has the effect of reducing bandwidth demands placed on the bus 115.

Figure 3:
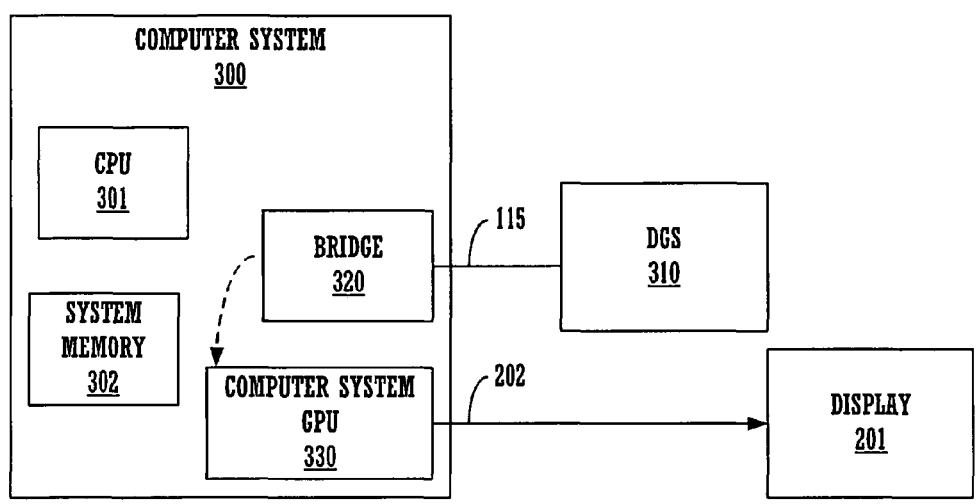
FIG. 3 shows a DGS in accordance with one embodiment of the present invention wherein the DGS is configured to utilize the display coupled directly to a computer system.

FIG. 3 shows a DGS 310 in accordance with one embodiment of the present invention wherein the DGS 310 is configured to utilize the display 201 as coupled directly to a computer system 300 (e.g., as opposed to being connected to the DGS as in the FIG. 2 embodiment). The DGS 310 embodiment is configured to transmit rendered video data back to the computer system 300 using the available bandwidth of the bus 115. The DGS 310 functions with the components of the computer system 300 (e.g., CPU 301, system memory 302, bridge 320, and the computer system GPU 330) to present the rendered video data on the display 201. Thus, in this case, the resources of the computer system GPU 330 (e.g., frame buffers, DACs, etc.) are used to drive the display 201.

The DGS 310 embodiment of FIG. 3 provides an advantage in that the resources available in a typical desktop or laptop computer system can be used to drive the display 201. This allows the DGS 310 to be more easily connected and used by a typical computer system. For example, when the performance benefits of a powerful 3D rendering system are desired, the DGS 310 can hot plug to the computer system 300 and immediately begin driving its display 201, as opposed to forcing a user to disconnect the display 201 from the computer system 300 and reconnect the display to the DGS 310.

Figure 4:
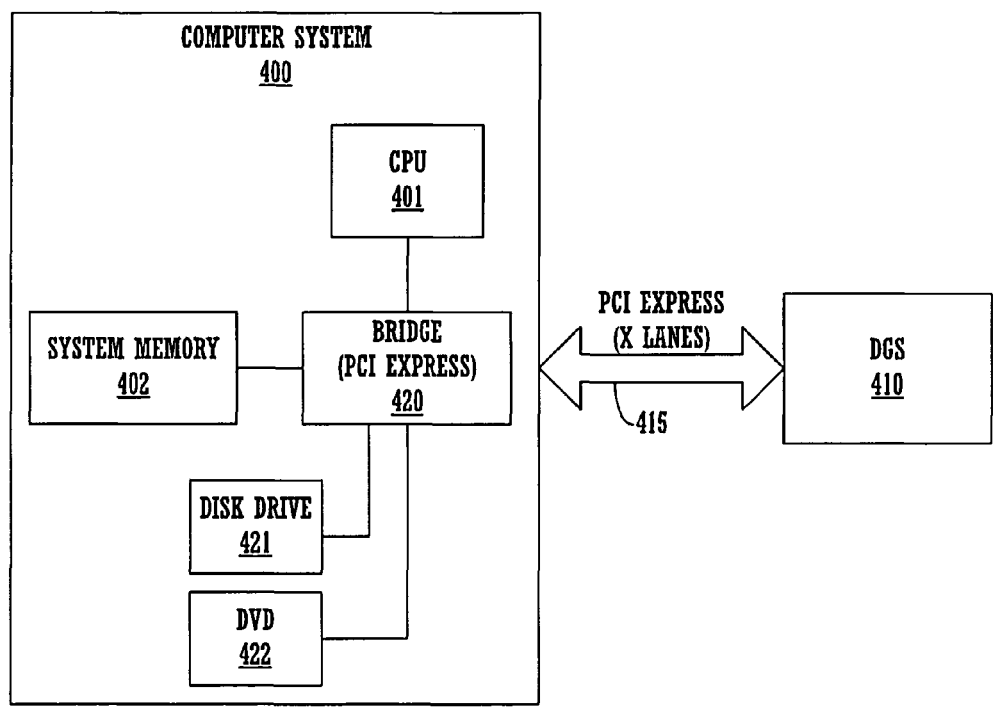
FIG. 4 shows certain components of a computer system and a bus in accordance with one embodiment of the present invention.

FIG. 4 shows certain components of a computer system 400 and a bus 415 in accordance with one embodiment of the present invention. In the present embodiment, the bus 415 is a PCI Express bus. The PCI Express bus 415 couples a DGS 410 to a PCI Express bridge 420 of computer system 400. The PCI Express bridge 420 provides the internal data transfer bandwidth between the CPU 401, system memory 402, and the personal devices (e.g., disk drive 421, DVD drive 422, and the like).

The use of a PCI Express bus 415 provides a number of advantages. For example, PCI Express comprises a serial bus standard that serializes data for much more efficient transfer in comparison to older parallel bus standards (e.g., AGP, etc.). Furthermore, the PCI Express standard defines increased bandwidth transfer modes whereby multiple "lanes" can be combined to scale data transfer bandwidth. For example, the typical PCI Express bus connecting a graphics subsystem to system memory is specified as a "16 lane" bus, whereby 16 serial PCI Express data pathways are linked to provide 16 times the data transfer bandwidth of a single lane PCI Express bus. If more bandwidth is needed, an additional number of PCI Express lanes can be used to implement the bus 415.

The PCI Express bus 415 can be much longer than the older parallel buses. For example, prior art AGP buses could not be more than several millimeters long without risking data skew and data corruption. This effectively forced the GPU to be located, or plugged, directly onto a computer system's motherboard. In contrast, a PCI Express bus cable can be more than one meter long, allowing the DGS 410 to be completely removed (e.g., located some distance away) from the chassis of the computer system 400.

Figure 5:
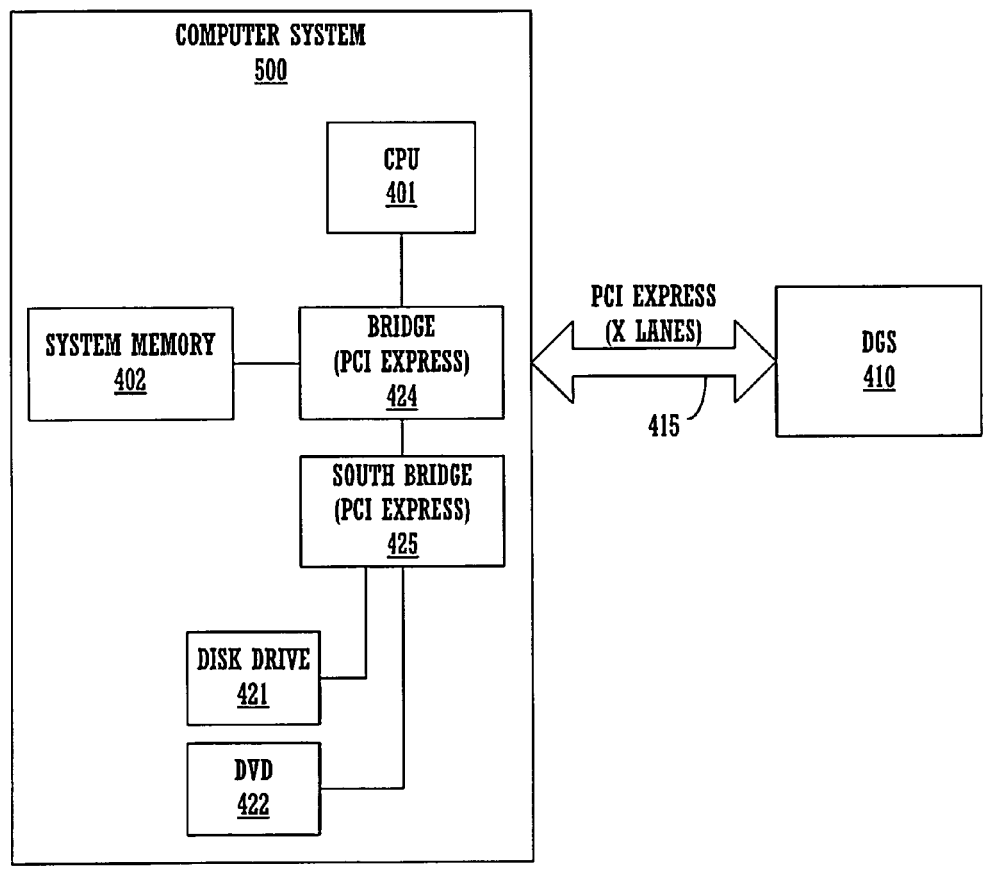
FIG. 5 shows certain components of a computer system in accordance with one embodiment of the present invention.

FIG. 5 shows certain components of a computer system 500 in accordance with one embodiment of the present invention. In the computer system 500 embodiment, a PCI Express North bridge 424 and a PCI Express South bridge 425 are used in place of a single bridge 420 as in computer system 400 of FIG. 4. Computer system 500 shows a typical North bridge/South bridge configuration whereby the North bridge 424 provides memory master/memory controller functionality for the system memory 402 and the South bridge 425 provides data transfer bandwidth for the peripheral devices (e.g., disk drive 421, DVD drive 422, and the like).

Figure 6:
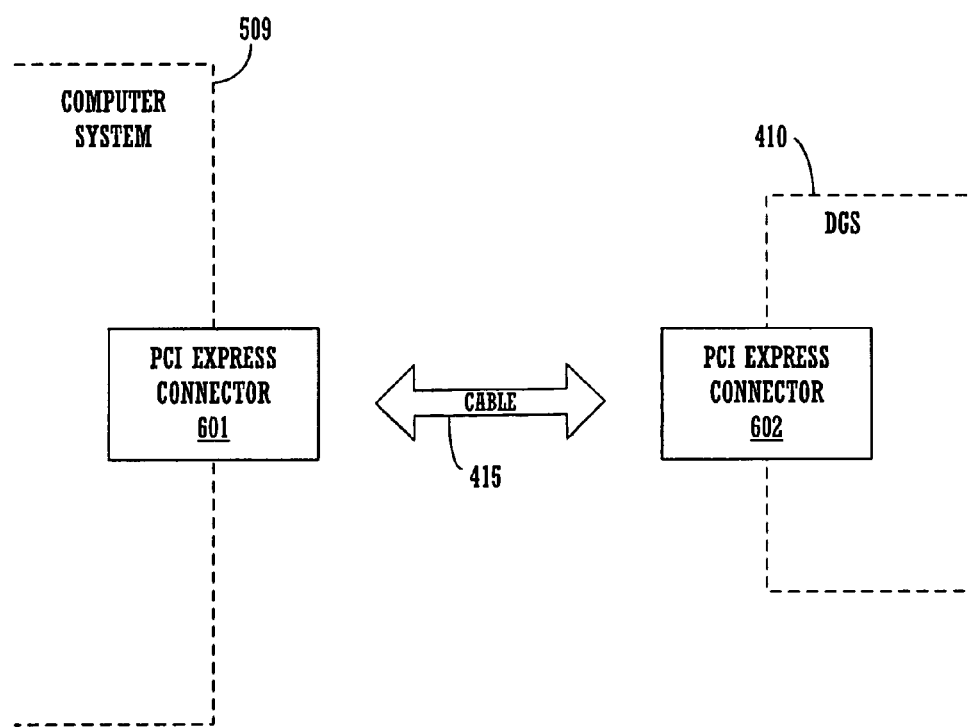
FIG. 6 shows a diagram depicting the manner in which a DGS in accordance with one embodiment of the present connects to a computer system via PCI Express connectors.

FIG. 6 shows a diagram depicting the manner in which a DGS in accordance with one embodiment of the present invention connects to a computer system via PCI Express connectors 601 and 602. The PCI Express standard provides a hot plug capability whereby devices can be connected and disconnected from a PCI Express bus while remaining on. This allows the DGS 410 to be plugged into the computer system 400 virtually on demand. For example, when high-performance 3D rendering is desired (e.g., for a high fidelity real-time 3D rendering application), the DGS 410 can be simply plugged in to provide the necessary performance. Additionally, as described above, a PCI Express bus cable 415 can be more than one meter long, allowing the DGS 410 to be completely removed from the chassis of the computer system 500.

Figure 7:
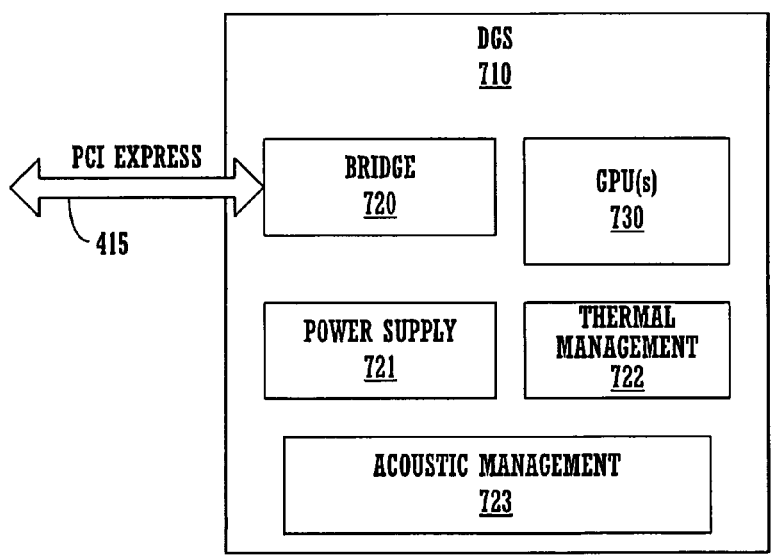
FIG. 7 shows internal components of a DGS in accordance with one embodiment of the present invention.

FIG. 7 shows internal components of a DGS 710 in accordance with one embodiment of the present invention. As depicted in FIG. 7, the DGS 710 comprises a chassis separate from the computer system chassis. This chassis includes a DGS bridge 720 for coupling to the PCI Express bus 415, one or more GPUs 730, a power supply 721, a thermal management system 722, and an acoustic management system 723.

As depicted FIG. 7, the DGS 710 embodiment includes one or more GPUs for executing graphics instructions from a coupled computer system (e.g., computer system 500, etc.). As described above, the graphics instructions received from the computer system via the PCI Express bus 415.

The independent power supply 721 is for providing power to DGS components independent of a computer system's power supply. Thus power supply requirements for future GPU performance increases can evolve independent of any external constraints of any industry-standard computer system configurations (e.g., ATX form factor standards, BTX form factor standards, etc.).

The thermal management system 722 is for providing a source of cooling independent of a computer system's cooling configuration. Thus, cooling requirements for future GPU performance increases can evolve independent of any external constraints (e.g., BTX cooling standards, etc.). For example, the thermal management system 722 can comprise the heat sink fans, heat pipe mechanisms, liquid cooling mechanisms, or the like.

Similarly, the acoustic management system 723 is for providing acoustic management mechanisms/algorithms which function independent of a computer system's cooling, power, or operating constraints. For example, specialized sound absorbing materials can be used in the chassis of the DGS 710. Similarly, special operating modes can be used to control the speed/operation of the power supply 721 and thermal management system 722 of the DGS 710 to reduce noise.

Figure 8:
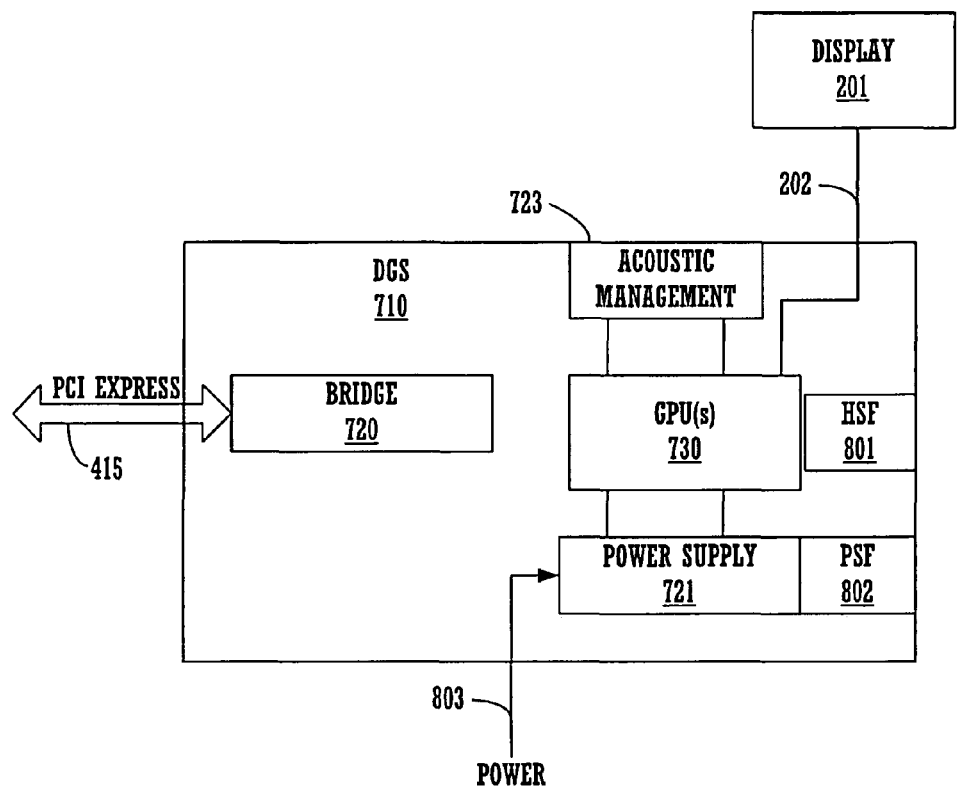
FIG. 8 shows an exemplary configuration of the internal components of the DGS in accordance with one embodiment of the present invention.

FIG. 8 shows an exemplary configuration of the internal components of the DGS 710 in accordance with one embodiment of the present invention. As depicted in FIG. 8, the DGS 710 includes a heat sink fan (HSF) 801 and a power supply fan (PSF) 802 for providing thermal dissipation for the GPU(s) 730 and the power supply 721. In the FIG. 8 embodiment, these components are controlled by an acoustic management system 723. In FIG. 8 embodiment, a separate power connection 803 (e.g., AC power) is shown coupled to the power supply 721 and a dedicated connection is shown for the display 201.

Figure 9:
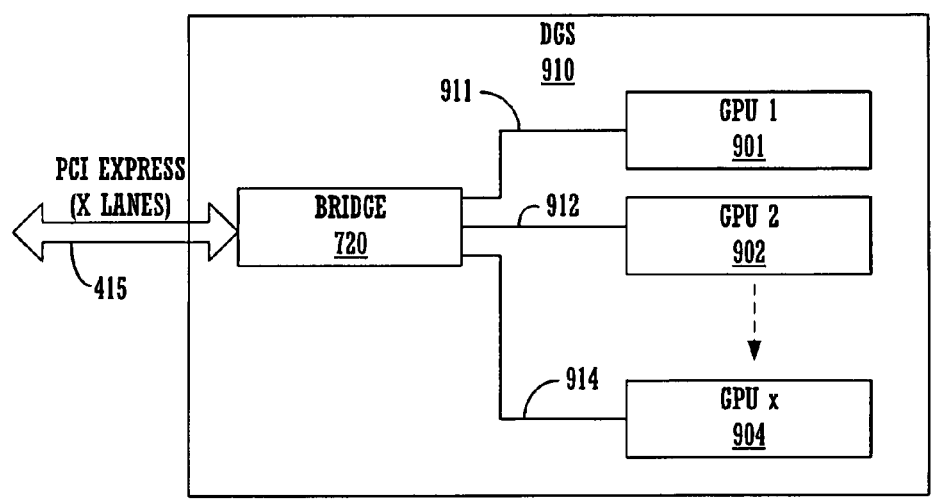
FIG. 9 shows a scalable DGS in accordance with one embodiment of the present invention.

FIG. 9 shows a scalable DGS 910 in accordance with one embodiment of the present invention. As depicted FIG. 9, the DGS 910 includes the DGS bridge 720 which functions by coupling a plurality of GPUs the PCI Express bus 415. A number of GPUs are shown coupled to the bridge 720. This is shown as a GPU 1 901, GPU 2 902, and GPU X 904 are shown. Each of the GPUs (GPU 1 through GPU X) has a respective bus link to the DGS bridge 720 (e.g., shown as links 911-914).

The DGS 910 embodiment shows the scalability features of a DGS in accordance with one embodiment of the present invention. The DGS bridge 720 functions by cooperatively sharing the data transfer bandwidth of the PCI Express bus 415 among the links 911-914. The sharing is configured to allow the GPUs to cooperatively execute 3D graphics instructions from a coupled computer system (e.g., computer system 500).

As described above, the data transfer bandwidth available with a multi-lane PCI Express bus connection (e.g., a 16 lane PCI Express bus) removes a critical performance bottleneck present in prior art type parallel bus connections. The available data transfer bandwidth allows the performance of a graphics subsystem to rapidly scale. Embodiments of the present invention take advantage of this increased data transfer bandwidth by utilizing GPUs in a cooperative execution array.

Graphics processing workload can be allocated among available GPUs such that the workload is executed parallel. Such cooperative execution enables a rapid scaling of graphics subsystem rendering performance. Additionally, because of the features of a DGS system in accordance with embodiment of the present invention, the scaling is not limited by the constraints (e.g., power constraints, thermal constraints, etc.) of any coupled computer system.

For example, because the DGS system 910 can include its own dedicated power supply (e.g., power supply 721 of FIG. 8), and because the DGS system 910 can include its own thermal management system (e.g., HSF 801 and PSF 802 of FIG. 8), the performance of the overall graphics subsystem is free to rapidly evolve as technology changes. Furthermore, removal of such computer system related constraints allows the inclusion of multiple GPUs as shown in FIG. 9, which provides a rapid upward scaling of graphics subsystem performance.

In one embodiment, the DGS bridge 720 functions by sequentially allocating the bandwidth of the PCI Express bus 415 to each of the GPUs in a round robin fashion. For example, the entire bandwidth of a 16 lane PCI Express bus 415 can be round robin allocated to the GPUs as they work on and complete portions of the overall graphics execution workload. Alternatively, in one embodiment, the bridge 720 can implement an arbitration mechanism, whereby the bus 415 is allocated to the GPUs on an as-needed basis.

Figure 10:
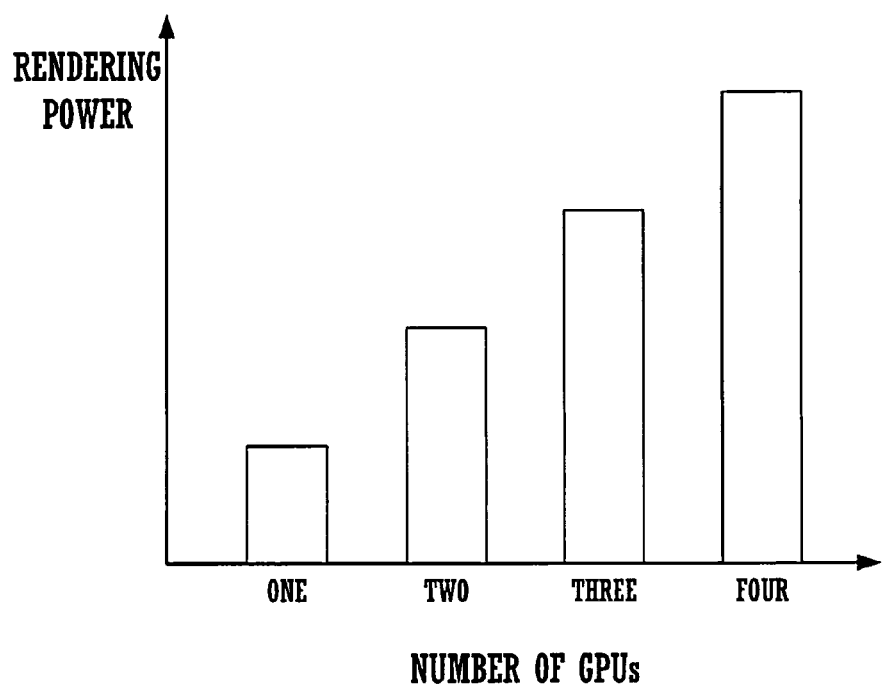
FIG. 10 shows a graph illustrating the increase in rendering performance as additional GPUs are added to a DGS in accordance with one embodiment of the present invention.

FIG. 10 shows a graph illustrating the increase in rendering performance as additional GPUs are added to a DGS 910 in accordance with one embodiment of the present invention. As shown in FIG. 10, adding additional GPUs causes a rapid increase in the rendering power of the DGS 910. For example, transitioning from a single GPU DGS to a dual GPU DGS yields a nearly 100% increase in rendering power. It should be noted that the increased rendering power is not quite 100% percent since some additional overhead is required to ensure the proper cooperative execution of the graphics processing workload.

Figure 11:
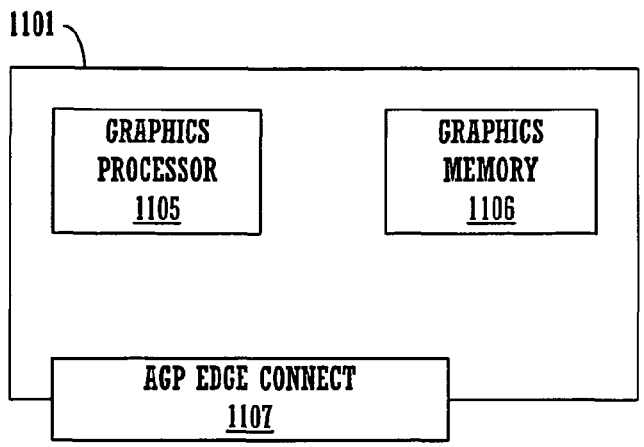
FIG. 11 shows an AGP based card mounted GPU in accordance with one embodiment of the present invention.

FIG. 11 shows an AGP based card mounted GPU 1101 in accordance with one embodiment of the present invention. The GPU 1101 comprises a graphics processor 1105, a graphics memory 1106, and an AGP edge connect 1107. Thus the GPU 1101 comprises a typical GPU available in a typical retail outlet. Such a GPU can be utilized off-the-shelf by a DGS system in accordance with embodiments of the present invention. The chassis of the DGS would include an AGP edge connect socket configured to accept the edge connect GPU 1101.

For example, the GPU 1101 can be purchased by a user to replace an older GPU. The upgrade can be accomplished by simply removing the older GPU from the DGS and simply inserting the new GPU 1101. The removal and replacement can be accomplished with requiring the user to open or otherwise access the chassis of the computer system.

Similarly, for example, the GPU 1101 can be purchased by the user to complement and existing GPU installed in the DGS. This allows the user to immediately scale the performance of the user's graphics subsystem by using the cooperative graphics instruction execution features of the DGS as described above.

Figure 12:
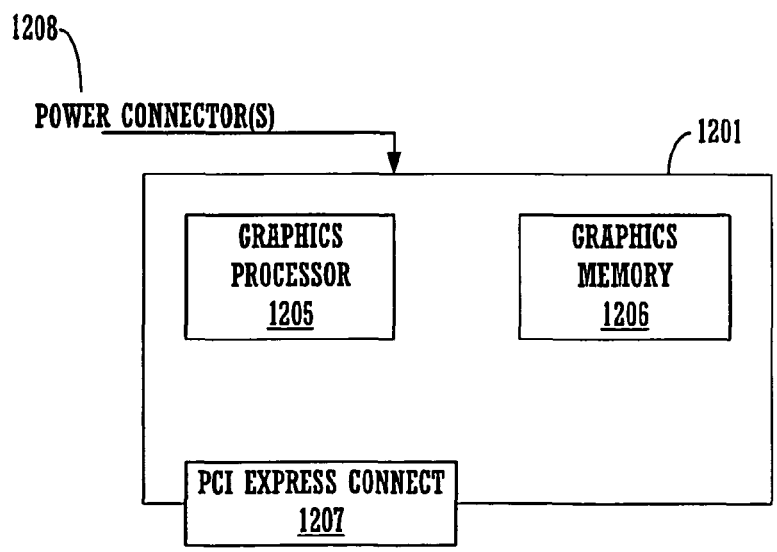
FIG. 12 shows a PCI Express based card mounted GPU in accordance with one embodiment of the present invention.

FIG. 12 shows a PCI Express based card mounted GPU 1201 in accordance with one embodiment of the present invention. The GPU 1201 is substantially similar to the GPU 1101. The GPU 1201 comprises a graphics processor 1205, a graphics memory 1206, and a PCI Express connect 1207, as opposed to the AGP edge connect 1107 of FIG. 11. Additionally, the GPU 1201 has one or more separate power connector (s) 1208 for coupling power directly to the GPU 1201. Such power connectors 1208 are increasingly common with modern high-performance GPUs. The chassis of the DGS would include a PCI Express connection socket configured except the PCI Express connect GPU 1201 and would also include appropriate sockets for the power connector(s) 1208.

It should be noted that in one embodiment, a DGS can except different types of card mounted GPUs. For example, the chassis of the DGS can include provisions for accepting AGP based GPUs and/or PCI Express based GPUs.

Figure 13:
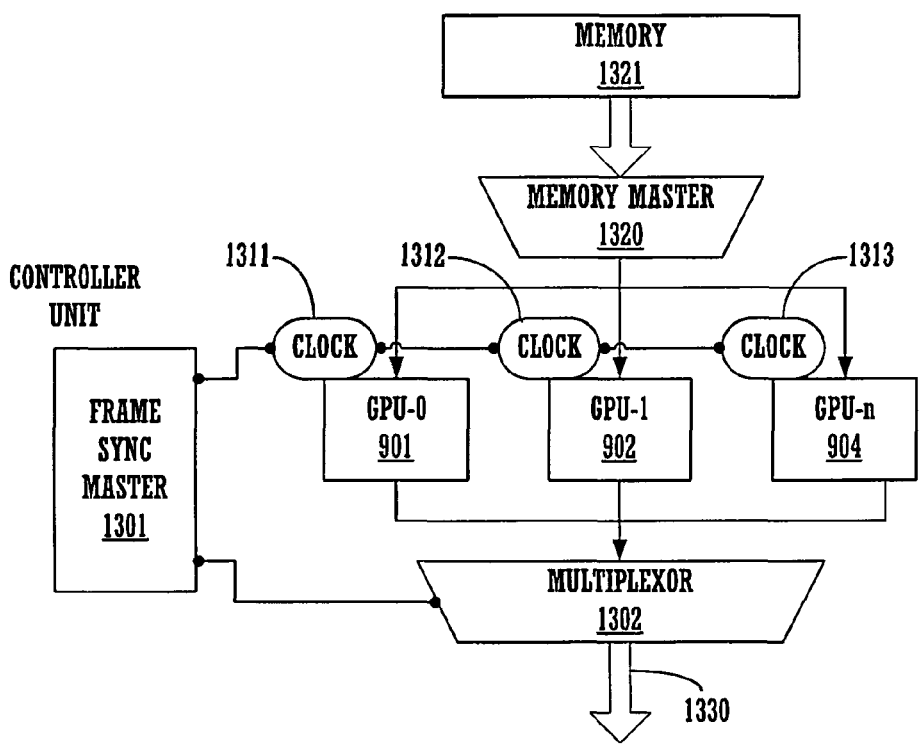
FIG. 13 shows a block diagram depicting internal components of a multiple GPU (graphics processor unit) graphics system in accordance with one embodiment of the present invention.

FIG. 13 shows a block diagram depicting internal components of a multiple GPU (graphics processor unit) graphics system 1300 in accordance with one embodiment of the present invention. The multiple GPU graphics system includes a plurality of GPUs 901-904 configured to execute graphics instructions from a computer system. A GPU output multiplexer 1302 and a controller unit, comprising a frame synchronization master 1301 and respective clock control units 1311-1313, are coupled to the GPUs 901-904. The multiple GPU graphics system 1300 can be used to implement the cooperative GPU execution processes for a DGS.

In the present embodiment, the frame synchronization master 1301 and respective clock control units 1311-1313 are configured to control the GPUs 901-904 and the output multiplexer 1302 such that the GPUs 901-904 cooperatively execute the graphics instructions from the computer system. The clock control units 1301-1313 function by enabling or disabling respective GPUs 901-904. The frame synchronization master 1301 functions by synchronizing the rendered 3D graphics frames produced by the respective GPUs 901-904. The output of the respective GPUs 901-904 are combined by the output multiplexer 1302 to produce a resulting GPU output stream 1330. The memory master 1320 (e.g., bridge 420 of FIG. 4) controls access to the memory 1321 (e.g., system memory 402 of FIG. 4).

Thus, the multiple GPU graphics system 1300 illustrates an exemplary configuration in which a cooperative execution among a plurality of GPUs (e.g., GPUs 901-904) can be implemented and controlled in accordance with one embodiment of the present invention. It should be noted that although system 1300 shows one exemplary configuration, other configurations for intimately cooperative execution among a plurality of GPUs are possible.

Figure 14:
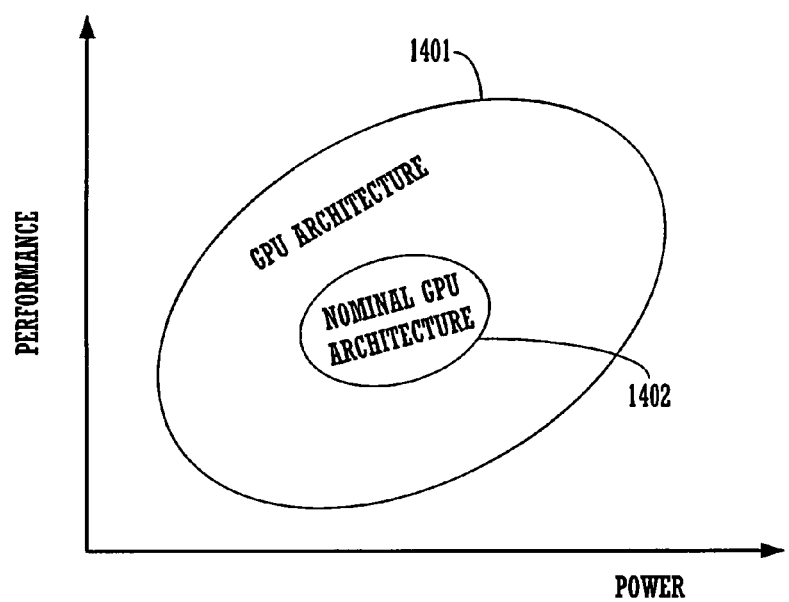
FIG. 14 shows a graph depicting the range of operation available to a multiple GPU graphics system in accordance with one embodiment of the present invention.

FIG. 14 shows a graph depicting the range of operation available to a multiple GPU graphics system 1300 in accordance with one embodiment of the present invention. The graphics system 1300 is capable of low-power modes and high-power modes. For example, to implement a low-power mode, the controller unit turns off one or more of the GPUs 901-904. This saves power while also reducing the peak performance of the graphics system 1300. To implement a high-power mode, the controller unit turns on additional GPUs to deliver additional rendering performance. This increases peak rendering performance while also increasing the power consumption.

This ability to implement different operating modes with respect to power and performance enables a multiple GPU graphics system 1300 to operate at a number of different power/performance points. This feature is graphically depicted in FIG. 14 as the operating envelope 1401 of the GPU graphics system 1300, which is shown as big much larger than the envelope 1402 of a nominal prior art GPU architecture.

Figure 15:
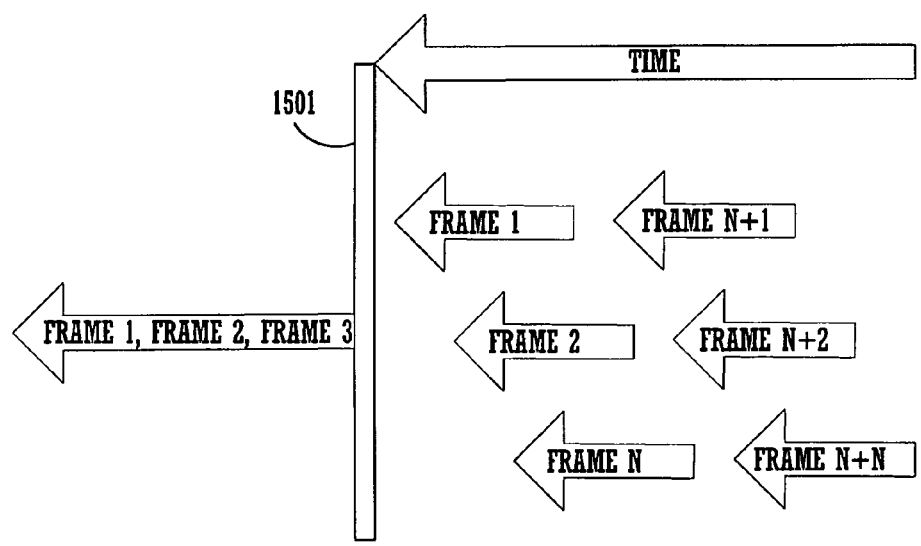
FIG. 15 shows a diagram depicting the manner in which the respective graphics instruction workload is executed by each of the GPUs.

FIG. 15 shows a diagram depicting the manner in which the respective graphics instruction workload is executed by each of the GPUs 901-904. For example, in one embodiment, sequential frames of rendering workload are assigned to the GPUs 901-902 (e.g., frame 1, frame 2, and so on to frame N+N). The sequential frames can be allocated to the GPUs 901-904 in a staggered fashion with respect to time such that the frames essentially executed in parallel and can be combined by the output multiplexer into a snooze uninterrupted GPU output stream, as shown by line 1501. In this manner, the respective graphics instruction workload for each of the GPUs 901-904 are executed by the GPUs in parallel.

It should be noted that although the multiple GPU graphics system 1300 can be used to implement functionality for a DGS coupled to the computer system, the multiple GPU graphics system 1300 can also be directly built into a chassis of a computer system (e.g., incorporated directly to a desktop computer system).

In one embodiment, each of the GPUs 901-903 has its own clock so that clock distribution and GPU-to-GPU skew around the chip or system is not as critical in other designs. This can significantly reduce the cost and complexity of chip or board layout. Each GPU is responsible for generating a portion (e.g., frame, series of frames, etc.) of the output stream 1330 with its neighboring GPUs. In one embodiment, the GPUs 901-903 in total are run at a slightly faster frame rate than needed by an application (e.g., 3D rendering application) to eliminate frame stuttering at the composite image sequence. As shown in FIG. 13, these frames are combined by the output multiplexer 1302 to deliver the final N-Frames-per-second. This significantly expands the fill-rates and frame-rate performance of the system 1300 without having to redesign the GPU core or using "bleeding edge" semiconductor fabrication process and ultra-high frequencies. In one embodiment, the array of GPUs share memory, so the total system cost is much less then with other architectures. The GPU-to-GPU skew, Frame distribution, and output multiplexer 1302 are managed by the Frame Sync Master 1301.

In this manner, the system 1300 architecture provides a number of benefits. For example, for graphics implementations for ultra-high performance that are AC-tethered, such as workstation and desktop applications, very high performance can be achieved by a super-scaled on-chip design that reuses GPU cores or with chip-on-PCB solutions. Similarly, graphics performance can be provided for ultra-low power graphics solutions from the same basic re-targetable GPU building blocks (e.g., for portable applications such as cell phones, PDAs, and Mobile Pcs). This feature yields a time-to-market and NRE (non-recurrent engineering) cost advantage in delivering products for each GPU generation for extreme performance and extreme mobile graphics solutions. Comparable fill rates and frame rates can be provided with significantly lowered clock frequencies, therefore delivering performance but with far less power. For example, as described above, the clock-per-GPU features allows unused GPUs to be dynamically turned on and off as dictated by an application. Simple 2D interfaces and DVD or mpeg playback will only require a fraction of the total system 1300 to be active, thereby significantly reducing the power used.

It should be noted that although the graphics system 1300 has been described in the context of a DGS chassis based system, the graphics system 1300 architecture can be implemented in a wide variety of computer system platforms, including, for example, desktop, workstation, mobile PCs, cell phones, PDAs, chipsets, and the like.

Figure 16:
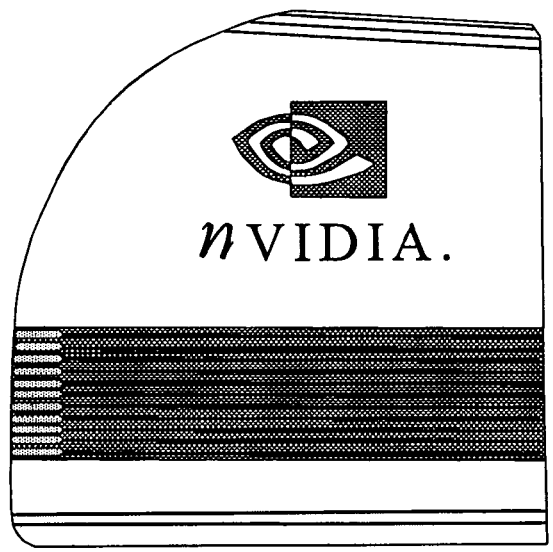
FIG. 16 shows a side view of a DGS in accordance with one embodiment of the present invention.
Figure 17:
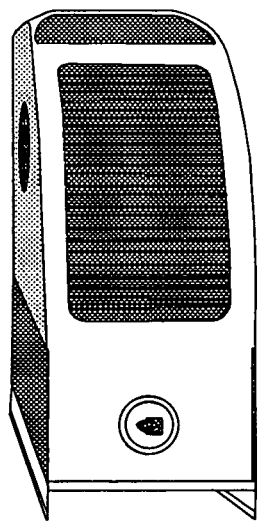
FIG. 17 shows a front view of the DGS in accordance with one embodiment of the present invention.
Figure 18:
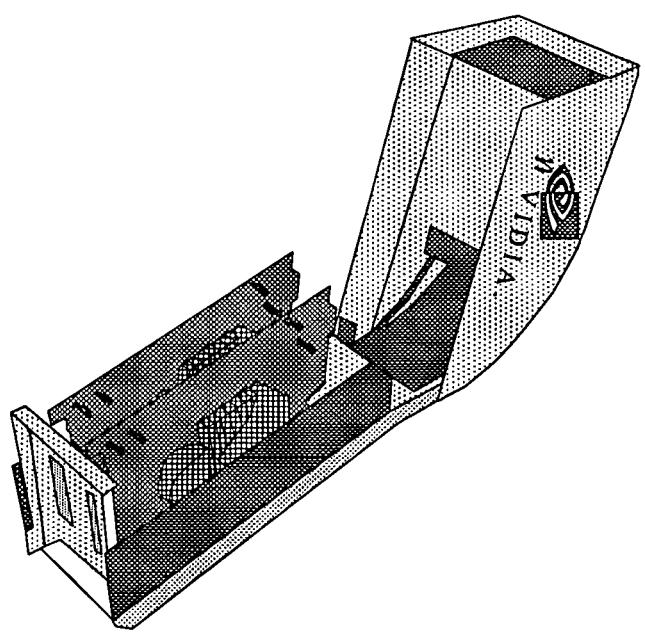
FIG. 18 shows a view of the DGS with the chassis cover removed in accordance with one embodiment of the present invention.
Figure 19:
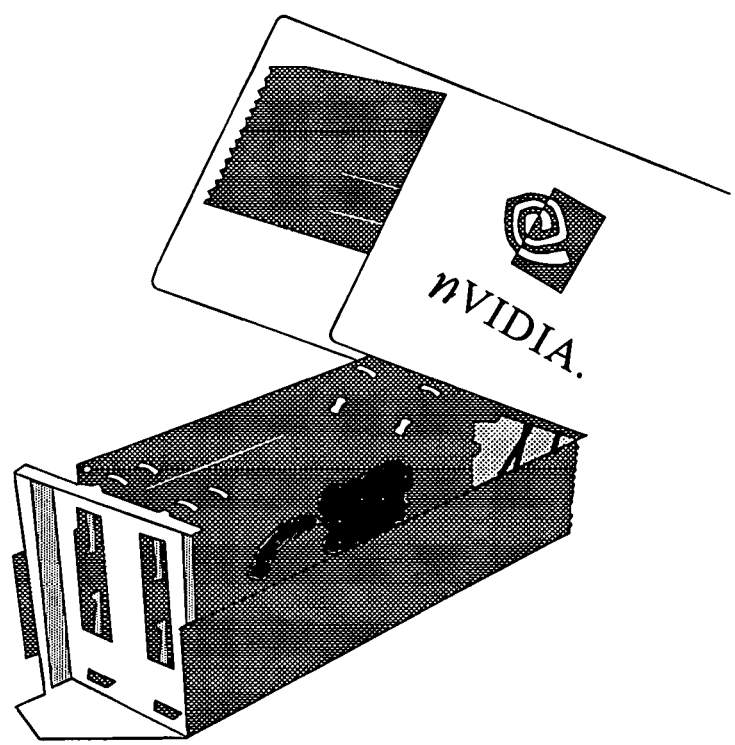
FIG. 19 shows a view of the chassis cover of the DGS as it is being closed in accordance with one embodiment of the present invention.
Figure 20:
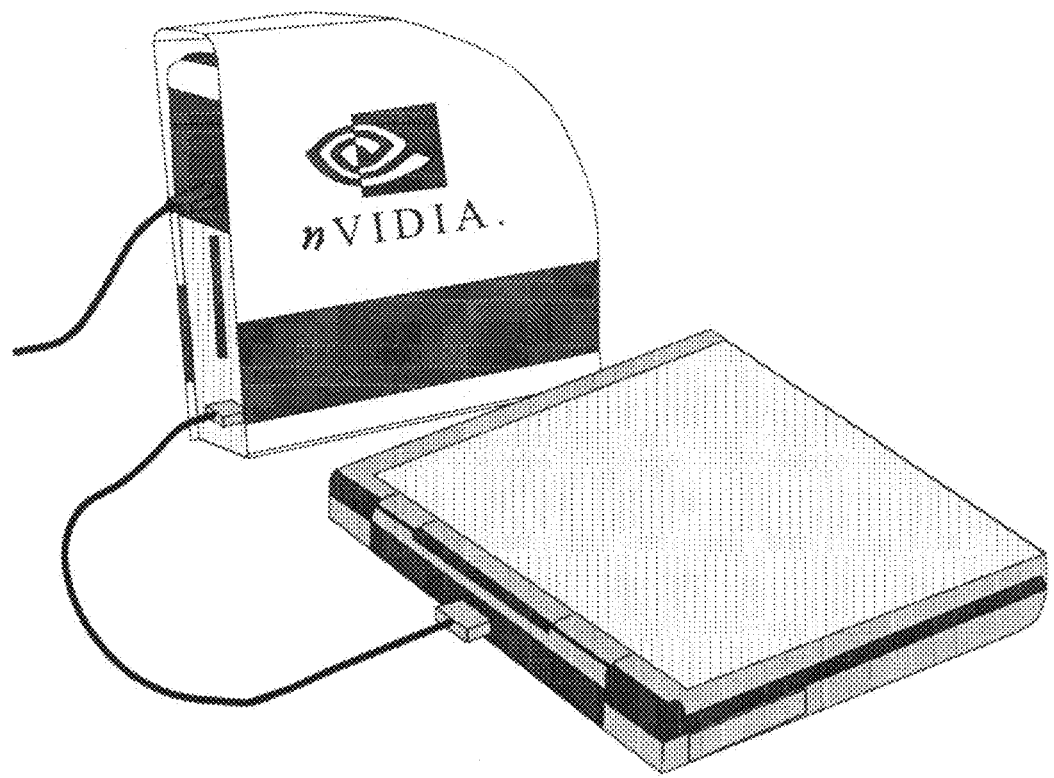
FIG. 20 shows a view of the DGS connected to a laptop computer system via a PCI Express cable in accordance with one embodiment of the present invention.
Figure 21:
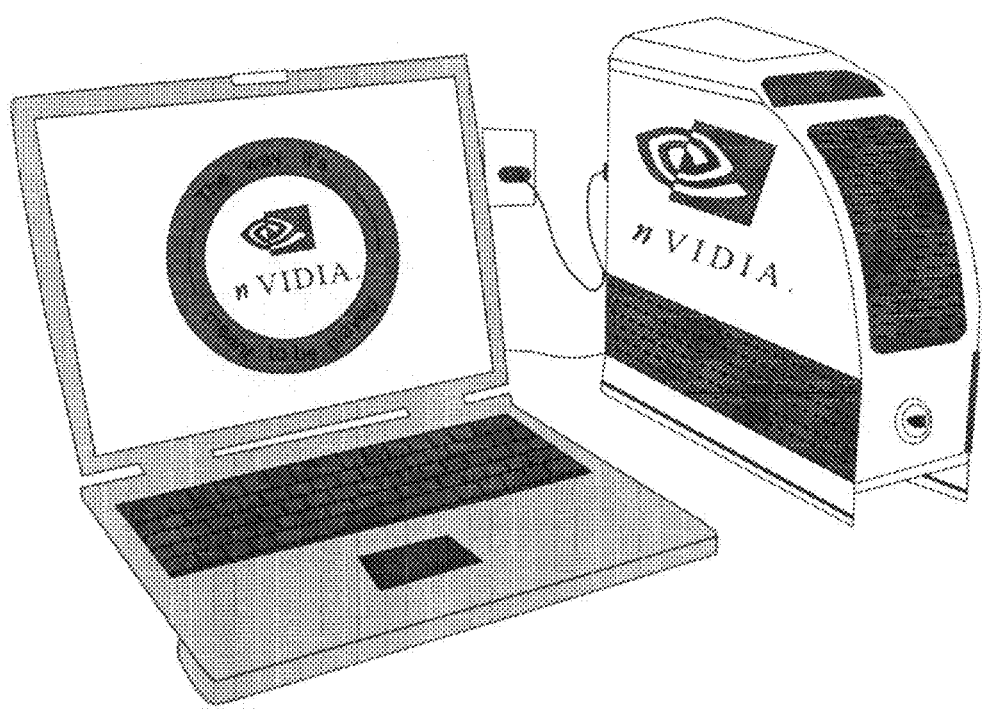
FIG. 21 shows a view of the DGS driving the display of the laptop computer system in accordance with one embodiment of the present invention.

Referring now to FIGS. 16 through 21, a plurality of views of a DGS in accordance with one embodiment of the present invention are shown. FIG. 16 shows a side view of a DGS in accordance with one embodiment of the present invention. FIG. 17 shows a front view of the DGS. FIG. 18 shows a view of the DGS with the chassis cover removed. This views shows two internal GPU cards coupled to the chassis of the DGS. FIG. 19 shows a view of the chassis cover of the DGS as it is being closed. FIG. 20 shows a view of the DGS connected to a laptop computer system via a PCI Express cable. FIG. 21 shows a view of the DGS driving the display of the laptop computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A scalable discrete graphics system, comprising:
   a serial bus bridge configured to couple a plurality of GPUs to a serial bus;
   a serial bus connector coupled to the serial bus bridge; and
   a system chassis coupled to the serial bus bridge and the serial bus connector and configured to house the GPUs, wherein the serial bus connector is configured to removably connect to a computer system, wherein the system chassis is separate and independent from the resources/constraints of the computer system, wherein the GPUs access the computer system via the serial bus bridge and the serial bus connector, and wherein the GPUs are operable to execute 3-D graphics instructions for the computer system to drive a display coupled to the computer system independent of the computer system GPU, and wherein results of execution of the 3D graphics instructions by the GPUs housed in the system chassis are sent back to the computer system.

2. The scalable discrete graphics system of claim 1, wherein the serial bus bridge is configured to connect to the computer system via a PCI Express bus and connect each of the plurality of GPUs to the computer system via the PCI Express bus.

3. The scalable discrete graphics system of claim 2, wherein the PCI Express bus between the serial bus bridge and the computer system is at least a 16 lane PCI Express bus connection.

4. The scalable discrete graphics system of claim 2, wherein the serial bus bridge is coupled to each of the plurality of GPUs via at least a 16 lane PCI Express bus connection.

5. The scalable discrete graphics system of claim 1, wherein the serial bus bridge is configured to enable an upward scaling of a 3-D rendering performance of the computer system by coupling at least one new GPU and at least one existing GPU coupled to the serial bus bridge, wherein the new GPU and the existing GPU cooperatively execute graphics instructions from the computer system.

6. The scalable discrete graphics system of claim 5, wherein the new GPU and the existing GPU are card mounted GPUs.

7. The scalable discrete graphics system of claim 1, further comprising:
   a power supply coupled to the system chassis for supplying power to the GPU independent of the computer system.

8. The system of claim 1, wherein the scalable discrete graphics system is operable to be coupled to a handheld device.

9. The system of claim 1, wherein the system chassis is external from a chassis of the computer system.

10. A method for a scalable discrete graphics system, comprising:
    accessing a plurality of GPUs via a serial bus and by using a serial bus bridge;
    accessing a serial bus connector coupled to the serial bus bridge; and
    executing 3-D graphics instructions for a computer system, wherein the GPUs access the computer system via the serial bus bridge and the serial bus connector, and wherein the serial bus connector is configured to removably connect to the computer system, and wherein the GPUs are housed in a system chassis and the GPUs are operable to execute 3-D graphics instructions for the computer system to drive a display coupled to the computer system independent of the computer system GPU, and wherein results of execution of the 3D graphics instructions are sent back to the computer system.

11. The method of claim 10, wherein the serial bus bridge is configured to connect to the computer system via a PCI Express bus and connect each of the plurality of GPUs to the computer system via the PCI Express bus.

12. The method of claim 11, wherein the serial bus bridge is coupled to each of the plurality of GPUs via at least a 16 lane PCI Express bus connection.

13. The method of claim 11, wherein the PCI Express bus between the serial bus bridge and the computer system is at least a 16 lane PCI Express bus connection.

14. The scalable discrete graphics system of claim 10, wherein the serial bus bridge is configured to enable an upward scaling of a 3-D rendering performance of the computer system by coupling at least one new GPU and at least one existing GPU coupled to the serial bus bridge, wherein the new GPU and the existing GPU cooperatively execute graphics instructions from the computer system.

15. The method of claim 14, wherein the new GPU and the existing GPU are card mounted GPUs.

16. The method of claim 10, further comprising:
    supplying power to the GPU independent of the computer system by using a power supply coupled to the system chassis.

17. A system for implementing scalable discrete graphics, comprising:
- a computer system;
- a PCI Express bridge configured to couple a plurality of GPUs to a PCI Express bus;
- a PCI Express connector coupled to the PCI Express bridge; and
- a system chassis coupled to the PCI Express bridge and the PCI Express connector and configured to house the GPUs, wherein the PCI Express connector is configured to removably connect to the computer system, and wherein the GPUs access the computer system via the PCI Express bridge and the PCI Express connector, wherein the GPUs are configured to execute 3-D graphics instructions for the computer system to drive a display coupled to the computer system independent of the computer system GPU, and wherein results of execution of the 3D graphics instructions by the GPUs housed in the system chassis are sent back to the computer system.

18. The system of claim 17, wherein the PCI Express bridge is configured to connect to the computer system via a PCI Express bus and connect each of the plurality of GPUs to the computer system via the PCI Express bus.

19. The system of claim 17, wherein the PCI Express bridge is configured to enable an upward scaling of a 3-D rendering performance of the computer system by coupling at least one new GPU and at least one existing GPU coupled to the PCI Express bridge, wherein the new GPU and the existing GPU cooperatively execute graphics instructions from the computer system.

20. The system of claim 17, further comprising:
- a power supply coupled to the system chassis for supplying power to the GPU independent of the computer system.

21. The system of claim 17, wherein the PCI express bridge allows the GPU to be dynamically coupled to the computer system.

22. The system of claim 17, wherein the GPUs are implemented as multi-GPU graphics cards.

* * * * *